Figure 1:
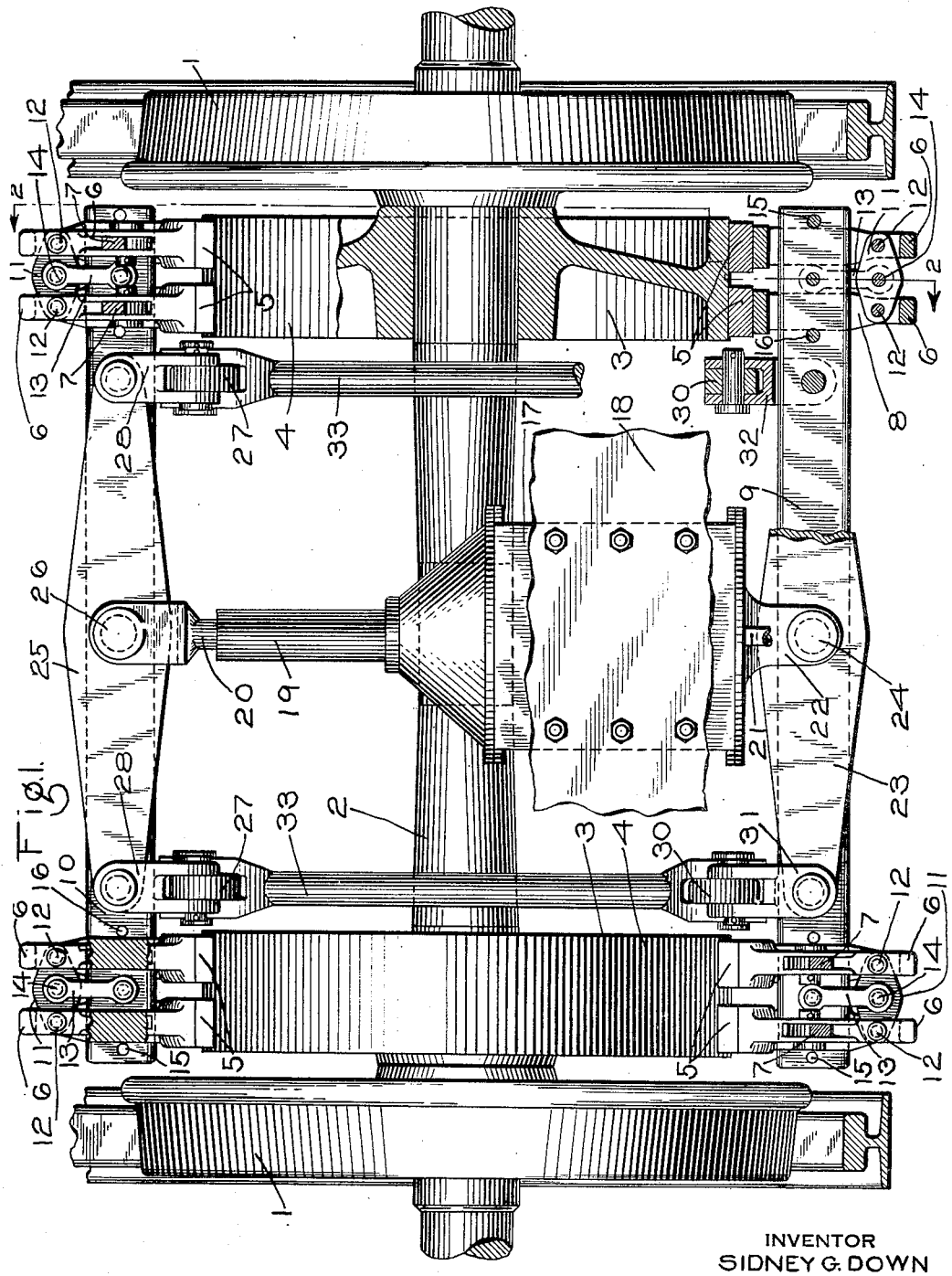

Feb. 27, 1940.　　　　S. G. DOWN　　　　2,191,821
BRAKE RIGGING
Filed May 28, 1938　　　　3 Sheets-Sheet 1

INVENTOR
SIDNEY G. DOWN
BY
ATTORNEY

Feb. 27, 1940. S. G. DOWN 2,191,821
BRAKE RIGGING
Filed May 28, 1938 3 Sheets-Sheet 2
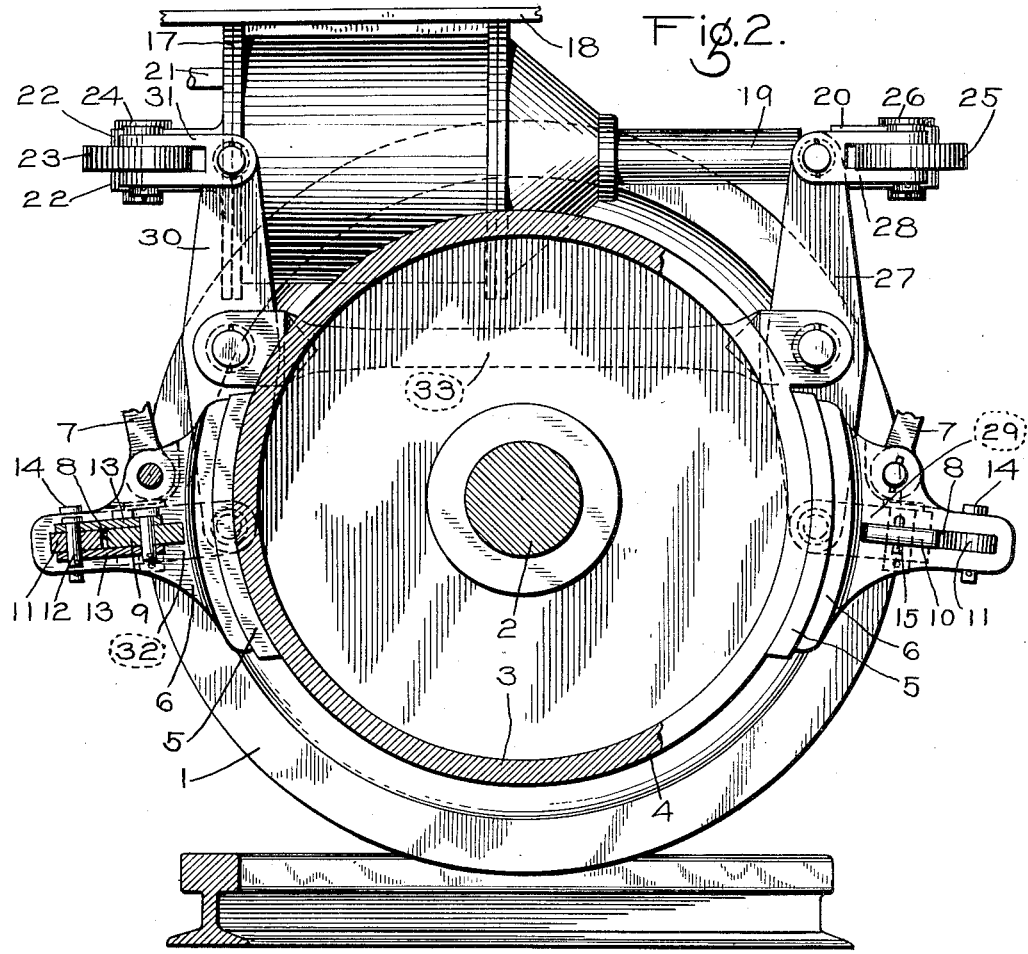
INVENTOR
SIDNEY G. DOWN
BY
ATTORNEY

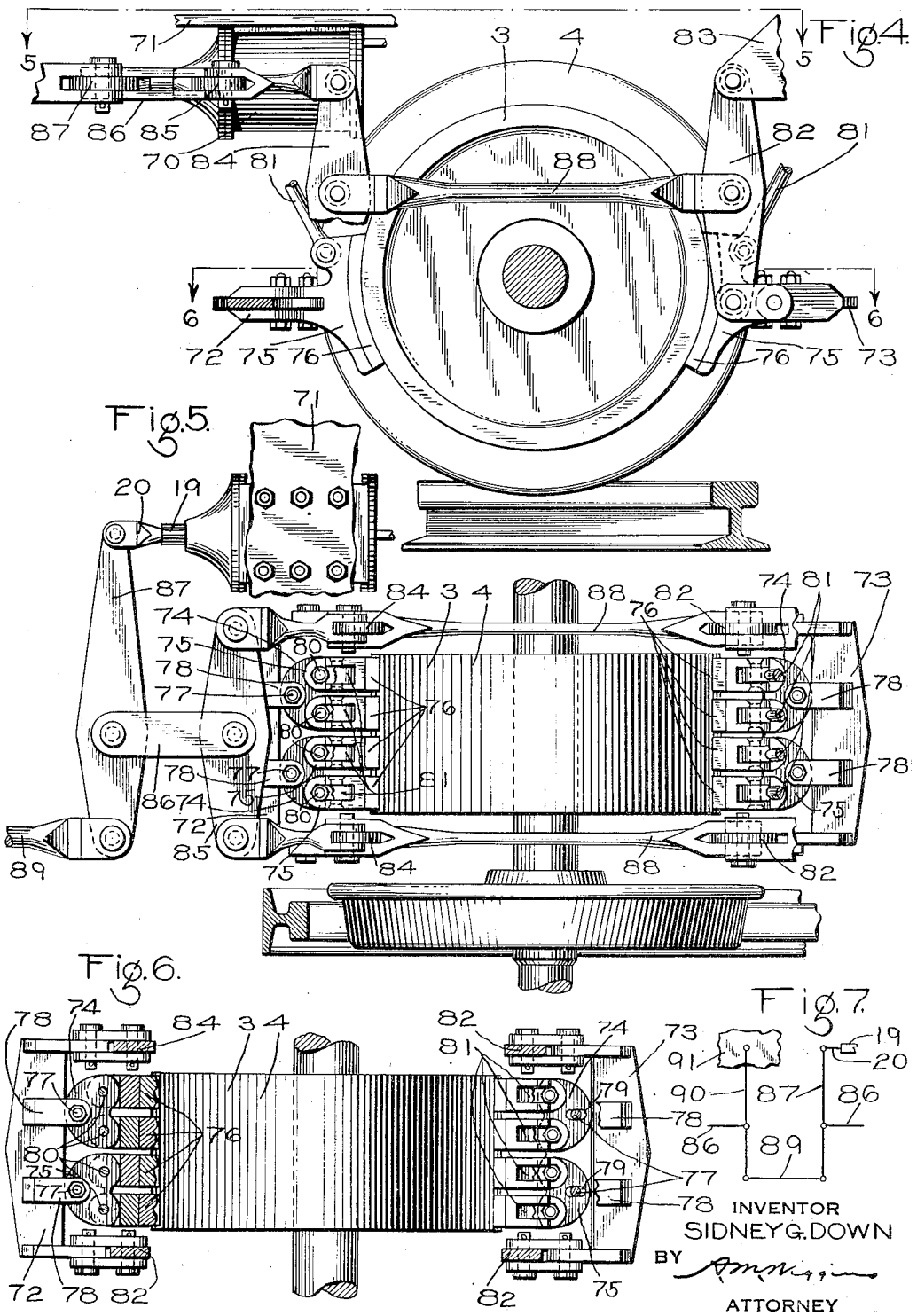

Patented Feb. 27, 1940

2,191,821

UNITED STATES PATENT OFFICE 2,191,821

BRAKE RIGGING

Sidney G. Down, Edgewood, Pa., assignor to The Westinghouse Air Brake Company, Wilmerding, Pa., a corporation of Pennsylvania Application May 28, 1938, Serial No. 210,721

15 Claims. (Cl. 188—58)

This invention relates to brake equipment for railway vehicles and more particularly to an improved form of drum brake for such vehicles.

In high speed train service it has been found that the usual brake having brake shoes which bear against the tread of the wheel in effecting an application of the brakes is inadequate to produce the desired braking action without undue wear and heating of the brake shoes and vehicle wheels. This is due particularly to the fact that the area of that portion of the face of the brake shoe which frictionally engages the face of the tread of the wheel is limited in width to the width of such tread and in length by the ability of the shoe to withstand warpage and breakage and by the proper relationship of its effective length to the diameter of the wheel.

In view of these difficulties the single shoe brakes have been largely replaced by clasp brakes in which there are two shoes for engagement with opposite sides of the tread of the wheel, but it has been learned in practice in high speed train service that even this type of brake is inadequate to meet the braking requirements.

From the foregoing it is apparent that a brake other than the type having one or two brake shoes for engagement with the tread of the wheel must be provided in order to obtain the desired braking effect. With this in mind it is an object of the present invention to provide a novel drum brake mechanism having a large effective braking area and a plurality of laterally spaced brake shoes for engagement with the braking surface of the drum.

Another object of the invention is to provide a novel drum brake equipment having a plurality of brake shoes for engagement with one side of the drum and having means for automatically equalizing the unit pressure on the shoes when an application of the brakes is initiated.

It has been learned that the coefficient of friction between engaging friction surfaces of a brake decreases as the unit shoe pressure increases. It therefore follows that maximum braking efficiency which requires a high coefficient of friction, will be realized only when the unit shoe pressure is kept relatively low and this calls for a large frictional contact area which in accordance with the present invention can be readily obtained by the use of as many brake shoes as may be desired and the use of a brake drum of sufficient length to accommodate the brake shoes.

Another very important advantage to be realized by the use of the invention, so far as the arrangement of the shoes and the relatively low unit shoe pressure required to produce adequate braking are concerned, is to avoid warping and breakage of the shoe which may occur as a result of high temperatures and high braking pressure per unit area.

Still another advantage to be realized by the use of a plurality of sets of spaced brake shoes is the dissipation of heat from the shoes by air currents which are free to circulate through the spaces between the shoes.

Another object of the invention is to provide a novel clasp brake arrangement for railway vehicles in which a brake drum is secured to an axle or wheel of the truck of the vehicle and in which a plurality of sets of laterally spaced brake shoes are provided for engagement of the drum at diametrically opposite sides of the drum.

Other objects and advantages will appear in the following more detailed description of the invention.

In the accompanying drawings Fig. 1 is a plan view partly in section of one form of drum brake mechanism constructed in accordance with the invention, a portion of the truck frame and a wheel and axle assembly of the truck being illustrated; Fig. 2 is a side elevational view, partly in section, of the construction illustrated in Fig. 1, the section being taken on the line 2—2 of Fig. 1; Fig. 3 is a fragmentary plan view, partly in section, of another form of the invention; Fig. 4 is a fragmentary side elevational view illustrating another form of the invention; Fig. 5 is a plan view of the construction illustrated in Fig. 4; Fig. 6 is a fragmentary sectional view taken on the line 6—6 of Fig. 4; and Fig. 7 is a diagrammatic view illustrating a portion of the brake rigging shown in Figs. 4, 5 and 6.

In Figs. 1 and 2 of the accompanying drawings the brake mechanism shown is of what may be termed the unit type, that is, the type in which the entire mechanism is associated with a single wheel and axle assembly of a railway vehicle truck. Only one wheel and axle assembly has been shown but it is to be understood that as many such assemblies as desired may be equipped with the unit brake mechanism.

The wheel and axle assembly shown is of the usual type comprising spaced wheels 1 which are secured by a press fit to an axle 2. The outer ends of the axle may be journalled in journal boxes (not shown) associated in any desired manner with a truck frame. The truck frame may be of any desired construction and only the part or parts thereof which have any cooperative relationship with the brake mechanism have been shown. The journal boxes and major portion of the truck frame have been omitted in order to more clearly illustrate the invention.

The brake mechanism may comprise two brake drums 3 which are arranged one adjacent each of the wheels 1 of the wheel and axle assembly and each is secured to the axle 2 of the assembly so as to rotate therewith. Each brake drum is provided with an outer or peripheral friction braking surface 4 which is adapted to be frictionally engaged at diametrically opposite sides of the drum by a pair of brake shoes 5 which are carried by brake heads 6. The brake shoes and brake heads at one side of each brake drum are spaced apart in a direction longitudinally of the axle 2 and are supported by hangers 7 which are pivotally connected to the brake heads and to the frame of the truck in the usual manner, there being a separate hanger for each brake head.

The brake heads 6 are provided with lateral slots 8 which are adapted to accommodate the ends of laterally extending brake beams 9 and 10 which terminate short of the wheels 1 of the wheel and axle assembly. These brake beams rest on the brake heads and are therefore supported from the truck frame by the hangers 7.

At a point located a short distance from the outer longitudinal edge of each brake beam the brake heads of each pair of heads are operatively connected together by means of a laterally extending horizontally disposed equalizer lever 11, the ends of the lever extending within the slots 8 in the heads and being pivotally connected to each head by means of a pin 12. The equalizer lever, intermediate its ends, is pivotally connected to the outer end of short spaced pull links 13 by means of a pin 14 and the inner ends of the links are pivotally connected to the adjacent end of the adjacent brake beam.

It will be apparent from the foregoing description that the only positive connection from the brake beams to the brake heads is through the medium of the links 13 and equalizer levers 11 and that due to such connections the brake heads of each pair of heads are free to move relative to each other and to the respective brake beam. This, as will hereinafter more fully appear, provides for the equalization of pressures on the brake shoes even though one brake shoe of a pair of shoes should wear away faster than the other.

Each end of each brake beam is provided with vertically extending stops 15 and 16 which are spaced apart in the direction of the length of the beam and which engage the brake heads and thereby prevent undue lateral movement of the heads relative to the brake beam, the stop 15 being in engagement with the outer brake head and the stop 16 being in engagement with the inner brake head.

Located between the brake drums 3 and above the axle 2 of the wheel and axle assembly is a brake cylinder 17 which is bolted or otherwise secured to a portion 18 of the truck frame. This brake cylinder may be of the usual type comprising a cylinder casing in which there is mounted a piston having a hollow stem 19 in which there is mounted the push rod 20. The brake cylinder piston just referred to is not shown in the drawings but since the construction of this actuating element is well known a showing thereof is deemed unnecessary. The pressure chamber of the brake cylinder is connected to a supply and release conduit 21.

The pressure head of the brake cylinder is provided with spaced longitudinally extending lugs 22 to which the central portion of a laterally extending and horizontally disposed brake lever 23 is pivotally connected by means of a pin 24. The outer end of the brake cylinder push rod 20 is pivotally connected to the central portion of a laterally extending and horizontally disposed equalizer lever 25 by means of a pin 26. The levers 23 and 25 are arranged one on each side of the axle 2 in the same horizontal plane with each other above the axle.

Located on each side of the brake cylinder and adjacent each brake drum 3 is a system of connected levers and rods through the medium of which the brake beams 9 and 10 are adapted to be actuated in applying and releasing the brakes. Each of these systems comprises a vertically disposed lever 27 which is arranged at one side of the axle 2 and which, at its upper end, is operatively connected to the adjacent outer end of the lever 25 by means of a clevis or link 28. The lower end of this lever 27 is operatively connected to the brake beam 10 by means of a bracket 29 which is secured to the beam. Each system also comprises a vertically disposed lever 30 which is arranged at the other side of the axle 2 and which, at its upper end is operatively connected to the adjacent outer end of the lever 23 by means of a clevis or link 31. The lower end of this lever 30 is operatively connected to the brake beam 9 by means of a bracket 32 which is secured to the beam.

The levers 27 and 30 are operatively connected together intermediate their ends by a connecting rod 33 located above the axle 2.

In operation, fluid under pressure is supplied through conduit 21 to the brake cylinder causing the brake cylinder piston and thereby the stem 19 and push rod 20 and lever 25 to move outwardly. The lever 25 as it is thus moved causes the levers 27 and thereby the levers 30 fulcrumed to the fulcrum lever 23 and operatively connected by the rod 33 to the lever 27 to act to move the brake beams 9 and 10 in opposite directions toward the brake drums 3. The brake beams as they are thus being moved act through the medium of the links 13 and equalizer levers 11 to move the brake heads in the same direction and thereby move the brake shoes into frictional braking engagement with the brake drums as shown in Figs. 1 and 2, each equalizer lever acting to insure the application of the same pressure to each brake head and shoe of each pair of heads and shoes even though one shoe may be of greater thickness than the other.

As shown and described the brake mechanism is of the clasp type but it is to be understood that the spaced brake head and shoe arrangement and the equalizing apparatus associated with the brake heads may be employed in single brake arrangements in which the brake shoes engage only one side of each brake drum.

In Fig. 3 another form of the invention is illustrated in which three brake shoes are employed for frictional braking engagement with each side of each brake drum and in which an equalizing mechanism is provided for insuring an equal pressure being applied to each shoe.

In this form of the invention the brake beams 43 and 43' correspond to the brake beams 9 and 10 respectively of the brake mechanism shown in Figs. 1 and 2 and secured to the outer end portion of each brake beam are members 40. Each member 40 is provided with a projecting portion 41 which extends between the spaced jaws 42 of a bifurcated end of the adjacent brake beam. The portion 41 is provided with top and bottom convex shoulders 44 which engage the inner edges of the jaws 42 as shown in Fig. 3. The portion 41 is also provided with a vertically disposed pin 45 which extends into accommodating slots in the brake beam and thereby adjustably secures the member 40 to the brake beam. It should here be mentioned that the slots extend in a direction, longitudinally of the brake beam and are of greater width than the diameter of the pin so as to permit free tilting movement of the head relative to the beam when, as will hereinafter appear, such movement occurs.

The member 40 is also provided with a vertically disposed back wall 46, and integral with the upper and lower ends of this wall are inwardly extending horizontally disposed top and bottom flanges 47 which are provided with spaced openings for the reception of vertically extending bolts 48.

Extending between the flanges 47 of the member 40 are the outer ends of two equalizing levers 49 and 50. Each of these ends of the levers is provided with a slot 51 through which the one of the bolts 48 extends which bolts are provided for the purpose of securing the levers to the member 40.

The levers 49 and 50 are substantially triangular in form as shown in Fig. 2. As before described the outer end of each lever is secured to the member 40 by means of the bolts 48. One of the inner ends of the lever 49 is operatively connected by means of a bolt 52 to a brake head 53 located adjacent one side of the brake drum 3 and the corresponding end of the lever 50 is operatively connected by means of a bolt 54 to a brake head 55 located adjacent the opposite side of the brake drum. The other inner ends of the levers overlap each other and are operatively connected together, and to a brake head 56 by means of a bolt 57, the brake head 56 being located between the brake heads 53 and 55.

As shown in Fig. 3 the outer ends of the levers 49 and 50 are adapted to be directly engaged by the back wall 46 when an application of the brakes is being effected and the inner ends directly engage the backs of the brake heads, the necessary clearance between the several bolts and associated parts being sufficient to insure such engagement without imposing shearing stresses on the bolts. From this it will be seen that the bolts associated with the member 40, brake beam and the levers 49 and 50 are for the sole purpose of maintaining these several parts in their proper cooperative relationship and are not intended to transmit braking pressure to the brake heads.

As shown the levers 49 and 50 are so constructed, proportioned and arranged that an equal unit braking pressure will be transmitted to each brake head. In this connection it will be noted that the overlapping arms of the levers are longer than the other arms thereof the proportions of the arms being such that both levers act to transmit the same braking pressure to the brake head 56 as is transmitted to the brake heads 53 and 55. Each brake head is pivotally supported by a hanger 58 which is pivotally connected to the truck frame in any desired manner.

Secured to each brake head in any desired manner is a brake shoe 59 which is provided for engagement with the peripheral friction surface of the drum 3.

The mechanism for operating the brake beams 43 and 43' and thereby the brake heads and shoes may be identical with the mechanism for operating the corresponding brake beams 9 and 10 of the brake shown in Figs. 1 and 2.

In Figs. 4, 5 and 6 another form of the invention is illustrated in which four brake heads and shoes are provided for braking engagement with each side of the brake drum 3 and in which there is a system of levers, rods and brake beams at each side of the truck for effecting the operation of the brake heads and shoes for at least two wheel and axle assemblies, each system being controlled by a brake cylinder 70 which is bolted or otherwise rigidly secured to any suitable part 71 of the truck frame.

This system of levers, rods and beams is identical for each side of the truck and in view of this the following detailed description will be limited to one system.

As shown the system comprises brake beams 72 and 73 which are located exteriorly of the brake drum 3 and which are disposed at diametrically opposite sides of the drum. These brake beams extend in a direction transversely of the truck and are of slightly greater length than the width of the brake drum.

Located between each brake beam and the adjacent braking surface of the brake drum are a pair of equalizing levers 74, brake heads 75 and brake shoes 76. The outer end of each lever 74 is made convex and is adapted to contact with the inner longitudinal edge of the adjacent brake beam. This end of the lever is attached by means of a bolt 77 to an inwardly extending jaw member 78 which, as shown in Figs. 4, 5 and 6, may be integral with the beam. The bolt passes vertically through circular opening in the jaws of the member 78 and through a slot 79 provided in the lever. This slotted connection is for the purpose of permitting the lever to operate freely to adjust itself to compensate for variations in the thickness of the brake shoes associated with the lever.

The inner end surface of each arm of the lever 74 is made convex and contacts with the back of one of the brake heads 75 pivotally connected to the lever by means of a bolt 80. The necessary clearance provided between the bolt 80 and the brake head to provide for free movement between the head and lever is sufficient to insure the direct engagement of the lever with the brake head thus effectively preventing shearing stresses from being transmitted to the bolt 80 whenever application of the brakes is being effected. These brake heads are each pivotally connected to the lower end of a hanger 81, the upper end of which hanger is pivotally connected in any desired manner to the truck frame. Each brake head has secured thereto in any desired manner a brake shoe 76 for engagement with the braking surface of the brake drum.

Each end of each brake beam 73 is operatively connected to the lower end of a vertically disposed hanger lever 82, the upper end of each lever being pivotally connected to a bracket 83 carried by the truck frame.

Each end of each brake beam 72 is operatively connected to the lower end of a vertically disposed live lever 84. The upper ends of the lever 84 are operatively connected to the opposite ends of a horizontally disposed equalizer lever 85 which is operatively connected intermediate its ends to one end of a longitudinally extending link 86, the other end of the link being operatively connected to an intermediate portion of a horizontally disposed brake cylinder lever 87.

The levers 82 and 84 at each side of the drum are operatively connected together intermediate their ends by means of a connecting rod 88.

The inner end of the brake cylinder lever 87 is operatively connected to the brake cylinder push rod 20. The outer end of this lever is operatively connected to one end of a pull link 89. As shown in Fig. 7 the other end of this link is operatively connected to the outer end of a horizontally disposed dead lever 90 which is fulcrumed at its other end to a portion 91 of the truck frame as shown in Fig. 7. The dead lever 90 between its ends is operatively connected to one end of the link 86 leading to the brake rigging for the wheel and axle assembly not shown.

The brake rigging just described is of the clasp type so that when the brake cylinder is caused to operate to effect an application of the brakes the brake beams 72 and 73 for each brake drum 3 are moved toward each other causing the brake shoes to frictionally engage diametrically opposite sides of the drum. It will here be noted that if there is any variation in the thickness of the shoes the equalizing mechanism will permit the shoes to properly engage the brake drum and will insure the application of an equal unit braking pressure on each brake shoe.

It will be noted that in each of the forms of the invention illustrated the brake shoes and brake heads of each set of heads and shoes are spaced apart so that air currents freely circulate about them and as a consequence assists in preventing the heads and shoes from becoming reheated when an application of the brakes is being effected. Since by the use of a plurality of brake shoes the unit pressure on each shoe is considerably less than on a single shoe and since the currents circulating about the brake heads and shoes these elements will be maintained relatively cool during an application of the brakes.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a brake mechanism, in combination, a brake drum, a plurality of brake elements arranged side by side exteriorly of said brake drum and movable into frictional braking engagement with the drum, each of said elements comprising a brake head, power dividing and transmitting means extending between and directly connected to the brake heads of said elements and operative to move the elements into engagement with the drum, and to equalize the power transmitted to each brake element, a brake beam for applying power to said power dividing and transmitting means, and means for applying power to said brake beam.

2. In a brake mechanism, in combination, a brake drum, a plurality of brake elements arranged side by side exteriorly of said brake drum and movable into frictional braking engagement with the drum, each of said elements comprising a brake head, a power dividing and transmitting lever extending transversely between the brake heads of said elements and pivotally connected at each of its ends directly to one of the brake heads, and an equalizing power applying mechanism operatively connected to said lever intermediate its ends.

3. In a brake mechanism, in combination, a brake drum, a plurality of brake elements arranged side by side exteriorly of said brake drum on opposite sides of the drum and movable into frictional braking engagement with the drum, a power dividing and transmitting mechanism for the brake elements on each side of the drum, and means common to both of the power dividing and transmitting mechanisms operative to apply power to the mechanisms.

4. In a brake mechanism, in combination, a brake drum, a plurality of brake elements arranged side by side exteriorly of said brake drum on opposite sides of the drum and movable into frictional braking engagement with the drum, a power dividing and transmitting mechanism for the brake elements on each side of the drum, a mechanism operative to apply braking power to both of said power dividing and transmitting mechanisms and thereby to said brake elements, and fluid pressure controlled means for actuating the power applying mechanism.

5. In a brake mechanism, in combination, a plurality of coaxially mounted brake drums, a set of brake elements arranged side by side and adjacent each brake drum, each set of brake elements being movable into frictional braking engagement with the adjacent brake drum, each of said brake elements comprising a brake head, a brake beam having its ends extending through openings provided in the brake heads of the elements, a power dividing and transmitting mechanism for each set of brake elements pivotally connected to the brake beam at a point located between the brake elements of one set and pivotally connected to each element of the said one set, said brake beam being operative to transmit braking power to the power dividing and transmitting mechanisms and thereby to the sets of brake elements, and means for actuating said brake beam.

6. In a brake mechanism, in combination, a plurality of axially mounted brake drums, a set of brake elements arranged side by side at diametrically opposite sides of each brake drum and operative into braking engagement with said drum, a plurality of power dividing and transmitting mechanisms operative for actuating each set of brake elements, and a single operating mechanism for all of said power dividing and transmitting mechanisms.

7. In a brake mechanism, in combination, a plurality of axially mounted brake drums, a set of brake elements arranged side by side at diametrically opposite sides of each brake drum and operative into braking engagement with said drum, a plurality of power dividing and transmitting mechanisms operative for actuating each set of brake elements, and a single equalizing operating mechanism for actuating all of said power dividing and transmitting mechanisms.

8. In a brake mechanism, in combination, a brake drum, a plurality of brake elements arranged side by side on diametrically opposite sides of the brake drum and movable in opposite directions into braking engagement with the drum, a brake beam operative for actuating the brake elements on each side of said drum, power dividing and transmitting means operatively connecting each brake beam and the respective brake elements, and means for actuating the brake beams.

9. In a brake mechanism, in combination, a brake drum, a plurality of brake elements arranged side by side on diametrically opposite sides of the brake drum and movable in opposite directions into braking engagement with the drum, a brake beam operative for actuating the brake elements on each side of said drum, equalizer lever means pivotally connecting the brake elements at one side of the brake drum to each other and to the respective brake beam, said equalizing lever means being operative to move the associated brake elements into braking engagement with the brake drum and to equalize the braking power applied to the elements, and means for actuating the brake beams.

10. In a brake mechanism, in combination, a brake drum, three brake elements arranged side by side and movable into braking engagement with said brake drum, power dividing and transmitting means operative to move the brake elements into engagement with the brake drum and to equalize the power applied to each element, and means for actuating said power dividing and transmitting means, said power dividing and transmitting means comprising two levers adapted, when braking power is applied thereto, to transmit equal power to each brake element.

11. In a brake mechanism for a wheel and axle assembly of a vehicle, in combination, spaced brake drums rotatable by said assembly, a set of a plurality of brake elements arranged side by side at each side of each brake drum and movable into braking engagement with the respective brake drum, two brake beams arranged one at each side of the drums and operative for actuating the sets of brake elements, an equalizing mechanism operatively connecting the elements of each set together and operatively connecting each set of brake elements to its respective brake beam, and a system of operatively connected levers and rods located between said brake drums for actuating said brake beams.

12. In a brake mechanism for a wheel and axle assembly of a vehicle, in combination, spaced brake drums rotatable by said assembly, a set of a plurality of brake elements arranged side by side at each side of each brake drum and movable into braking engagement with the respective brake drum, two brake beams arranged one at each side of the drums and operative for actuating the sets of brake elements, an equalizing mechanism operatively connecting the elements of each set together and operatively connecting each set of brake elements to its respective brake beam, and an equalizing system of operatively connected levers and rods located between said drums for actuating the brake beams.

13. In a brake mechanism for a wheel and axle assembly of a vehicle, in combination, spaced brake drums rotatable by said assembly, a set of a plurality of brake elements arranged side by side at each side of each brake drum and movable into braking engagement with the respective brake drum, two brake beams arranged one at each side of the drums and operative for actuating the sets of brake elements, an equalizing mechanism operatively connecting the elements of each set together and operatively connecting each set of brake elements to its respective brake beam, a system of operatively connected levers and rods located between said brake drums for actuating said brake beams, and a brake cylinder located between said brake drums for actuating said system of levers and rods.

14. In a brake mechanism, in combination, a brake drum, a plurality of brake elements arranged side to side at one side of the brake drum, and a system of operatively connected power transmitting elements for actuating said brake elements into braking engagement with said drum, said system comprising an actuated member located adjacent said brake elements, and an equalizing mechanism interposed between said member and elements, pins operatively securing said equalizing mechanism to said member and elements, said mechanism being adapted to directly engage said member and elements when power is applied to the member to prevent shearing stresses from being transmitted to said pins.

15. In a brake mechanism, in combination, a brake drum, a plurality of brake elements arranged side by side exteriorly of said brake drum and movable into frictional braking engagement with the drum, power dividing and transmitting means operative to move the brake elements into braking engagement with said brake drum and to equalize the power transmitted to each brake element, pins, a member operable to transmit power to the power dividing and transmitting means, and pins maintaining said power dividing means, member and brake elements assembled, said power dividing and transmitting means being adapted, when power is transmitted thereto, to directly engage said member and brake elements and thereby prevent shearing stresses from being transmitted to said pins.

SIDNEY G. DOWN.